United States Patent [19]
Henneberger et al.

[11] Patent Number: 5,214,735

[45] Date of Patent: May 25, 1993

[54] FIBER OPTIC CONNECTOR RETAINER

[75] Inventors: Roy L. Henneberger, Eagan; Jeffrey L. Korkowski, Bloomington, both of Minn.

[73] Assignee: ADC Telecommunications, Inc., Minneapolis, Minn.

[21] Appl. No.: 863,811

[22] Filed: Apr. 6, 1992

[51] Int. Cl.$^5$ ................................................ G02B 6/36
[52] U.S. Cl. .................... 385/136; 385/137; 385/147
[58] Field of Search .................. 455/3.1; 385/53, 134, 385/136, 137, 147; 174/50

[56] References Cited

U.S. PATENT DOCUMENTS

| | | | |
|---|---|---|---|
| 4,792,204 | 12/1988 | Praeur et al. | 385/136 |
| 4,995,688 | 2/1991 | Anton et al. | 385/53 |
| 5,127,082 | 6/1992 | Below et al. | 385/135 |

Primary Examiner—Frank Gonzalez
Attorney, Agent, or Firm—Merchant, Gould, Smith, Edell, Welter & Schmidt

[57] ABSTRACT

A retainer assembly is disclosed for a connector. The assembly includes a frame having a forward wall and a retainer to be received within an access opening in the forward wall. The retainer includes first and second fasteners. Each of the fasteners has forward and rear retaining surfaces spaced apart a thickness of the wall to receive an edge of the wall between the forward and rear retaining surfaces. The second fastener is resiliently displaceable between a fastening or rest position and a displaced position to permit the retainer to be easily inserted or removed from the frame.

6 Claims, 9 Drawing Sheets

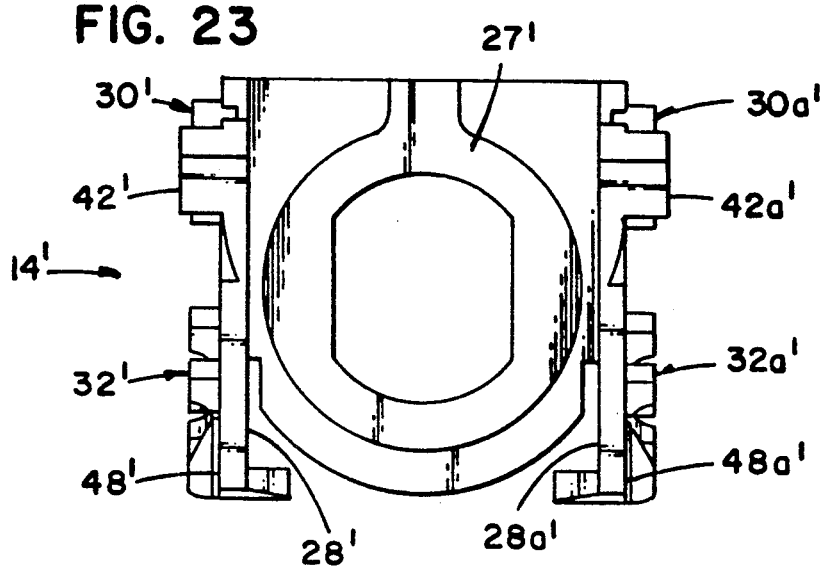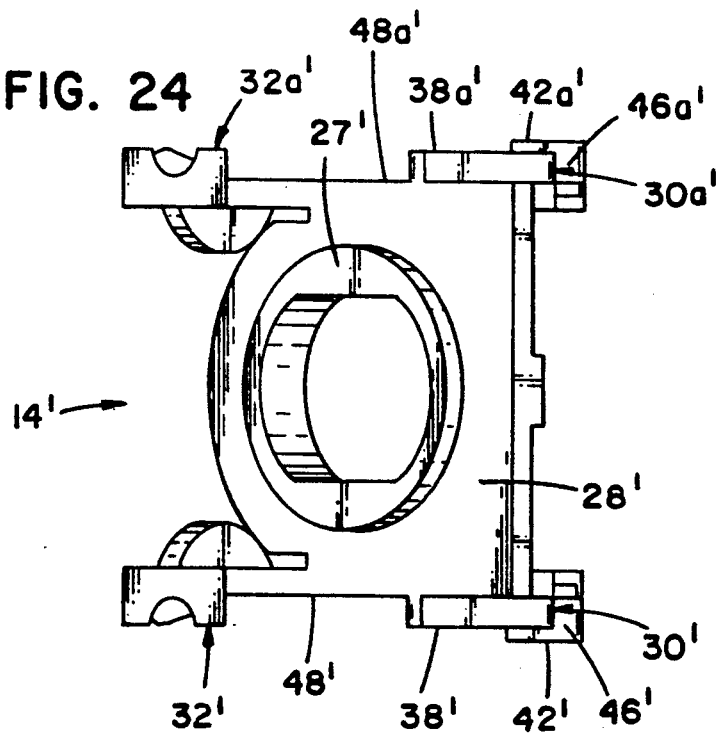

FIBER OPTIC CONNECTOR RETAINER

BACKGROUND OF THE INVENTION

1. Field of the Invention

This invention pertains to the fiber optic telecommunications industry. More particularly, this invention pertains to a retainer for retaining a fiber optic connector to a frame.

2. DESCRIPTION OF THE PRIOR ART

In the telecommunications industry, optical fibers are used to transmit signals. From time to time, it is necessary to splice, connect or otherwise join optical fiber pairs. A plurality of connectors are known in the industry. Commonly available connectors include so-called D-4 and ST connectors.

To secure the connectors to a frame, retainers are provided. The connector is secured to the retainer which, in turn, is secured to a frame. Examples of prior art retainers are shown in commonly assigned U.S. Pat. No. 4,995,688, dated Feb. 26, 1991. Particular reference in that patent is made to FIGS. 10–20. In the '688 Pat. No., the retainers are referred to as connector sleeve adapters and identified by the numerals 102. The adapters 102 receive commercially-available connector sleeves 100a–100d. As shown in the '688 Pat. No., the adapters or retainers (such as adapter 102a) include mounting clips 106 spaced from a mounting plate 104 to define a mounting slot 108 which receives a thickness of a connector panel 92. The structure is snapped into place by forcing the clips through a hole 96 with the resilient clip snapping into position and capturing a mounting plate 92 between a clip 106 and plate 104. The adapter includes an adapter structure 120 which is uniquely configured to receive and retain commercially-available connector sleeves and connectors. Shown best in FIG. 13, the retainer or adapter is configured such that the connector sleeve has an axis retained at an angle of about 45 degrees with the plane of the panel 92.

It is desirable to provide a retainer which may be more readily inserted or removed. Such is an object of the present invention.

SUMMARY OF THE INVENTION

A retainer assembly for a fiber optic connector is disclosed. The assembly includes a frame and a retainer. The frame has a wall defining an access opening. The wall has a predetermined thickness. The retainer includes a receiving member for receiving and supporting a fiber optic connector. The retainer further includes a first releasable fastener for fastening a first end of the retainer to the frame. The first releasable fastener includes a front retaining surface and a rear retaining surface spaced apart a distance approximate to the thickness of the wall. A second releasable fastener is provided for fastening a second end of the retainer to the frame. The second releasable fastener is resiliently connected to the receiving member to be urged between a rest position and a displaced position. In the displaced position, the second releasable fastener may be passed through the access opening. In the rest position, the second releasable fastener captures the wall.

BRIEF DESCRIPTION OF THE DRAWINGS

FIG. 23 is a view taken along line 23—23 of FIG. 18;
FIG. 24 is a view taken along line 24—24 of FIG. 17.

DESCRIPTION OF THE PREFERRED EMBODIMENT

Referring now to the several drawing FIGURES in which identical elements are numbered identically throughout, a description of the preferred embodiment will now be provided.

Figure 2:
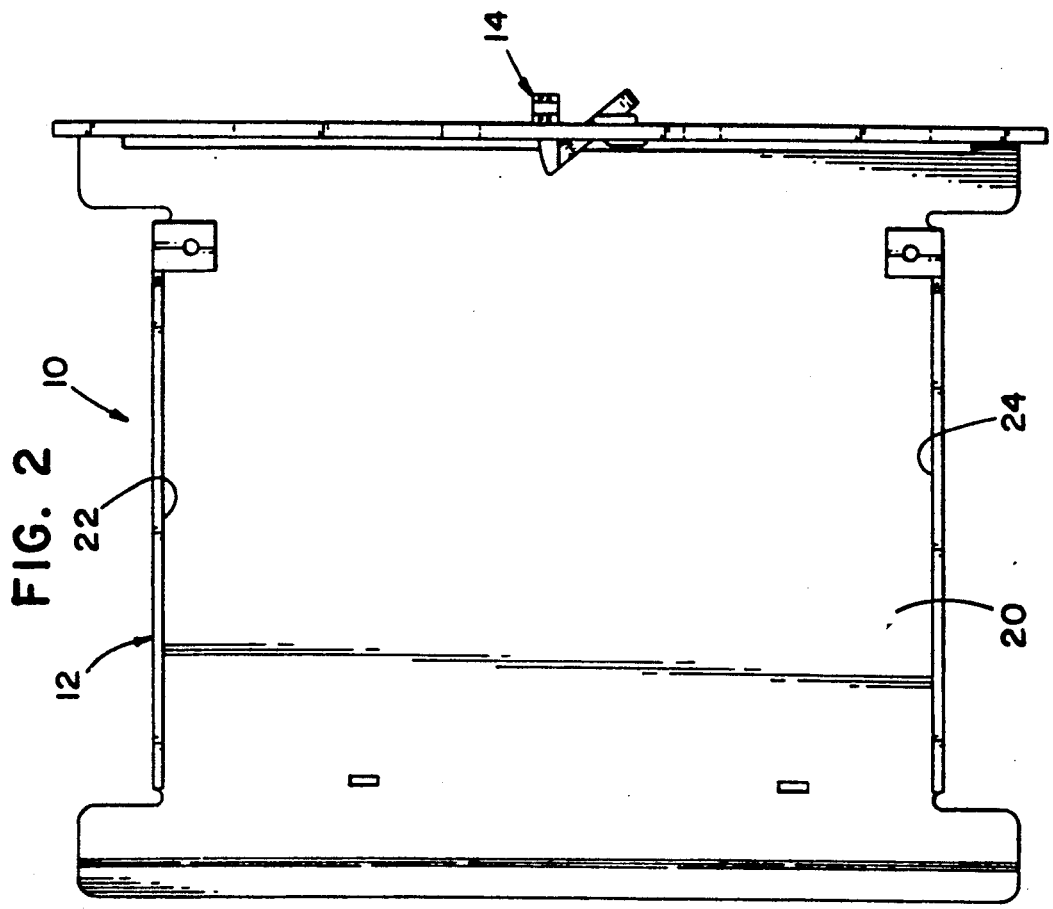
FIG. 2 is a top elevation view of the assembly of FIG. 1.
Figure 1:
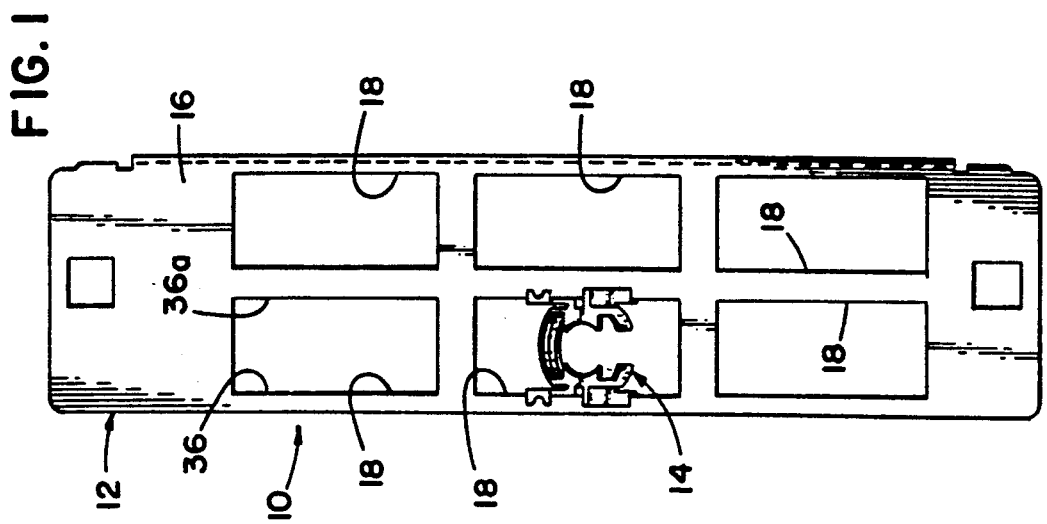
FIG. 1 is a front elevation view of a retainer assembly according to the present invention.

FIG. 1 shows an assembly 10 for retaining a plurality of fiber optic connectors. The assembly 10 includes a frame 12 and a retainer 14. In FIG. 1, only one retainer 14 is shown. However, as will become apparent, a plurality of retainers 14 are carried on the frame 12.

The frame 12 includes a front wall 16 having a plurality of access openings 18 formed therethrough. Extending perpendicularly away from the front wall 16 is a side wall 20 and top and bottom walls 22,24. The walls 20,22,24 extend from what may be conveniently referred to as the backside of the frame front wall 16. The frame 12 may be secured through any suitable means (not shown) to a chassis (not shown) such that a plurality of frames 12 may exist in side-by-side relation in a common chassis.

With initial reference to FIGS. 6–14, a retainer 14 according to the present invention is shown. The retainer 14 includes a receiving member 26 for receiving and supporting a fiber optic connector (not shown). In the embodiment of FIGS. 6–14, the receiving member 26 is configured to receive and retain a commercially available D-4 adaptor. Receiving members configured to receive a D-4 adaptor form no part of this invention per se. Examples of such are shown in U.S. Pat. No. 4,995,688.

The receiving member 26 includes a right side wall 28 and a spaced apart left side wall 28a. Each of the side walls 28,28a is provided with a rear fastener 30,30a and a front fastener 32,32a. Each of rear fasteners 30,30a is a mirror image of the other (as are each of front fasteners 32,32a). Accordingly, a description of the right fasteners 30,32 will suffice as a description of the left fasteners 30a,32a.

The rear fasteners 30 include outer walls 34. Walls 34 and 34a are parallel and spaced apart approximate to a distance between side edges 36,36a of front wall 16.

Figure 8:
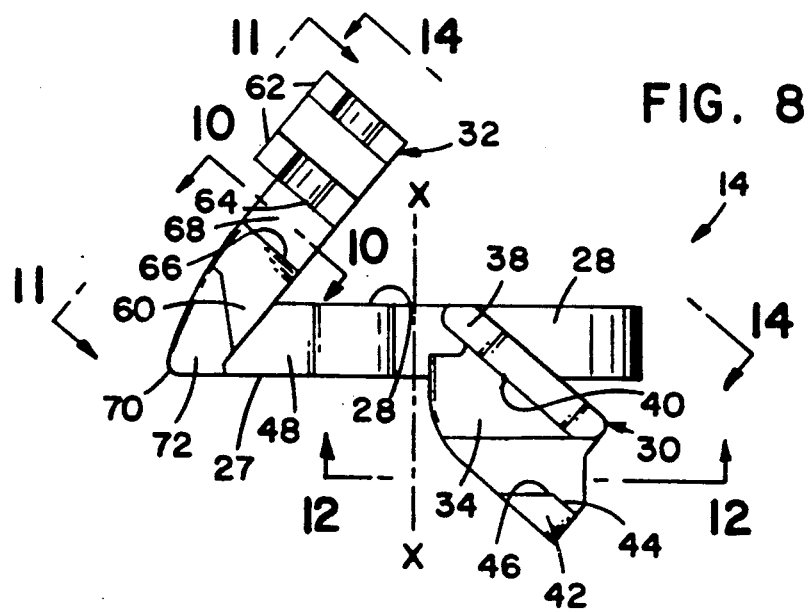
FIG. 8 is a top elevation view of the retainer of FIG. 6.
Figure 9:
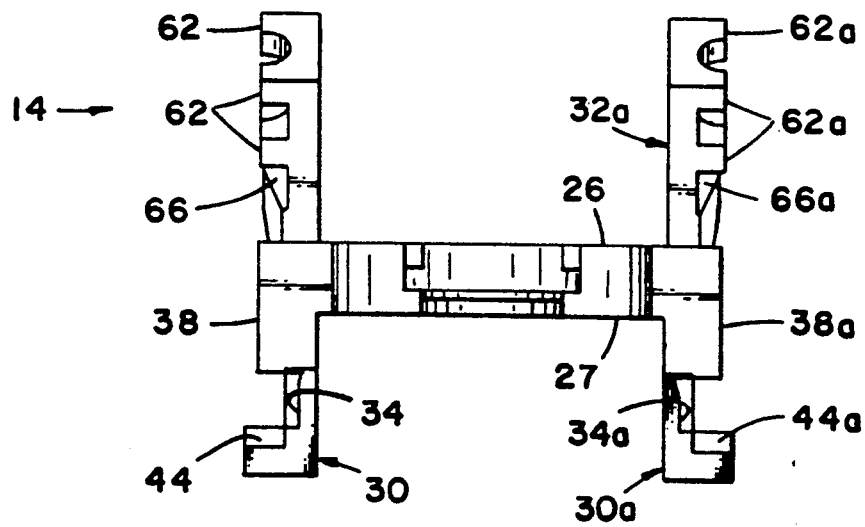
FIG. 9 is an end elevation view of the retainer FIG. 6.
Figure 10:
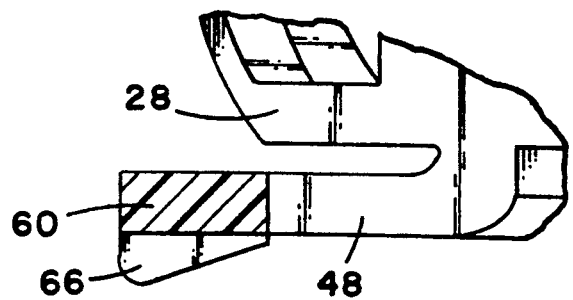
FIG. 10 is a view taken along line 10—10 of FIG. 8.
Figure 11:
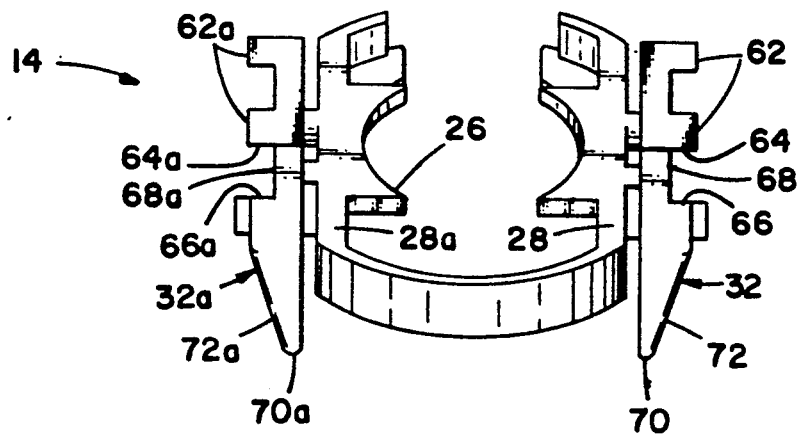
FIG. 11 is a view taken along line 11—11 of FIG. 8.
Figure 12:
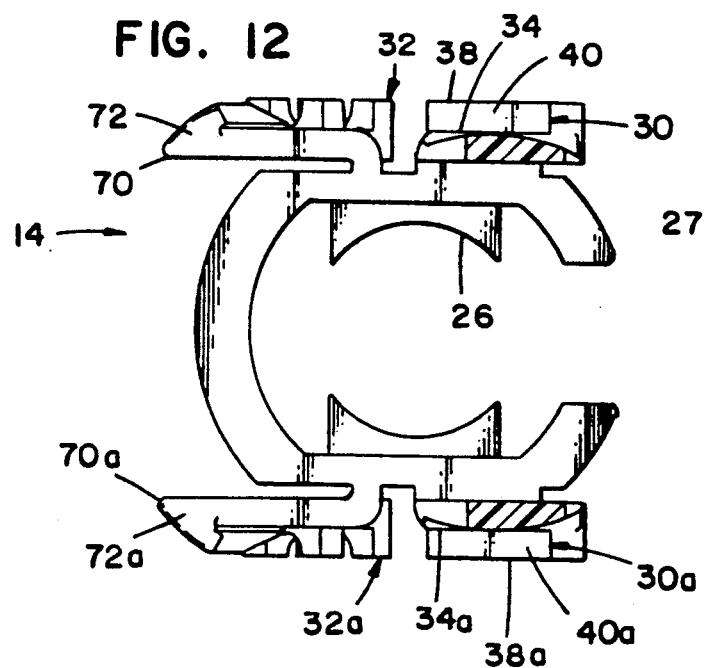
FIG. 12 is a view taken along line 12—12 of FIG. 8.
Figure 13:
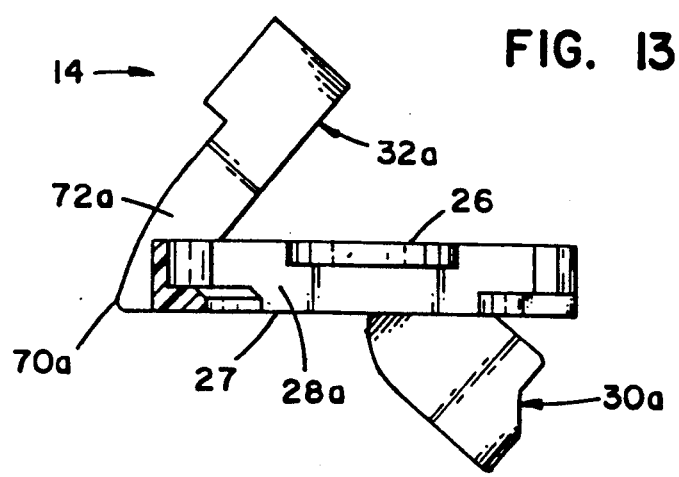
FIG. 13 is a view taken along line 13—13 of FIG. 7.
Figure 14:
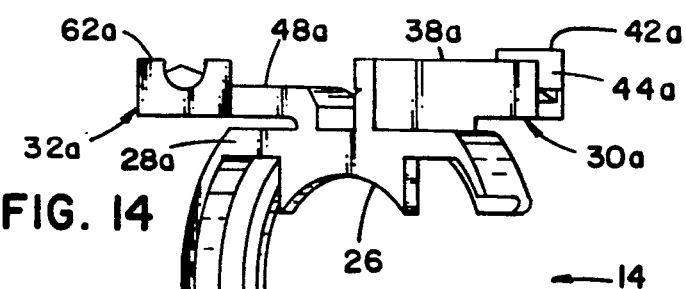
FIG. 14 is a view taken along line 14—14 of FIG. 8.
Figure 15:
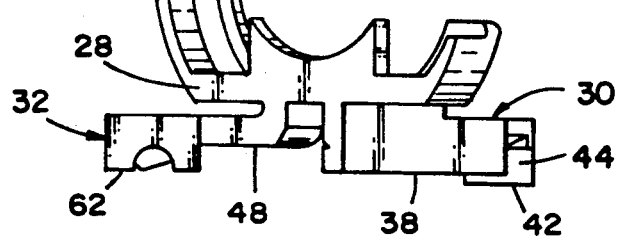
FIG. 15 is a perspective view of a retainer for use with an ST, connector.
Figure 15:
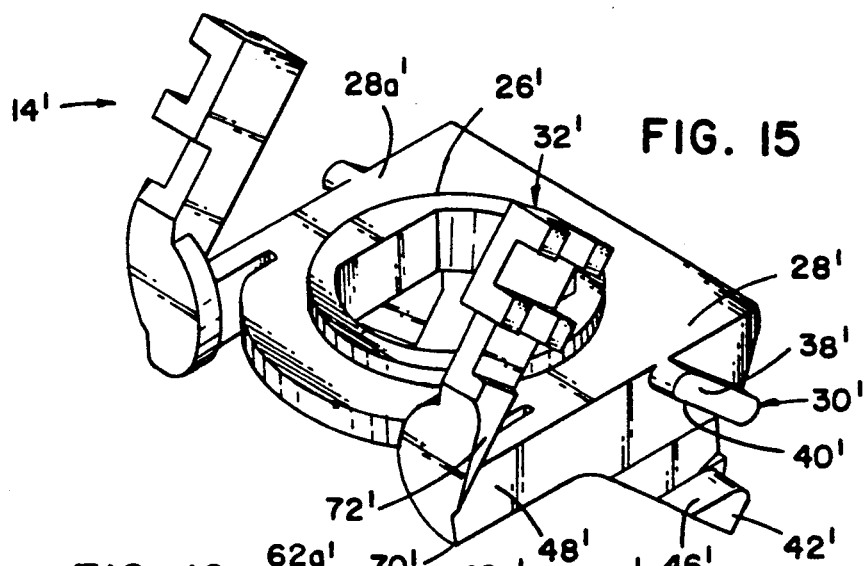
Figure 16:
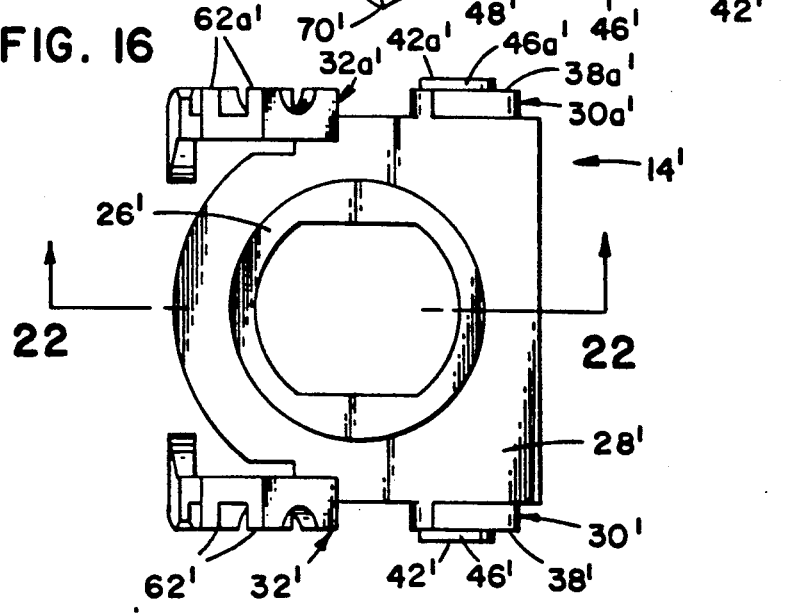
FIG. 16 is a front plan view of the retainer of FIG. 15.
Figure 17:
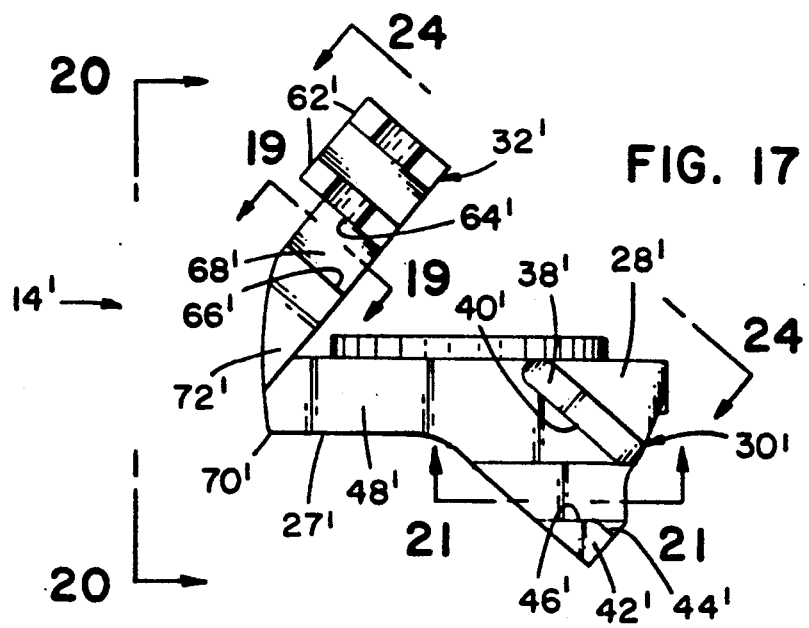
FIG. 17 is a top elevation view of the retainer of FIG. 15.
Figure 18:
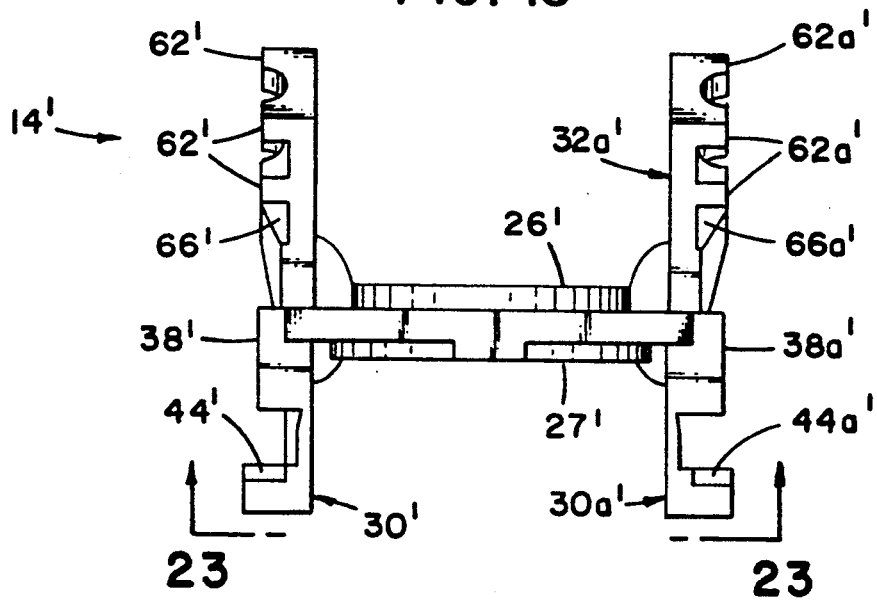
FIG. 18 is an end elevation view of the retainer of FIG. 15.
Figure 19:
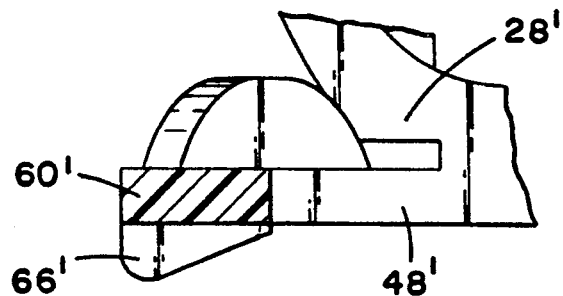
FIG. 19 is a view taken along line 19—19 of FIG. 17.
Figure 20:
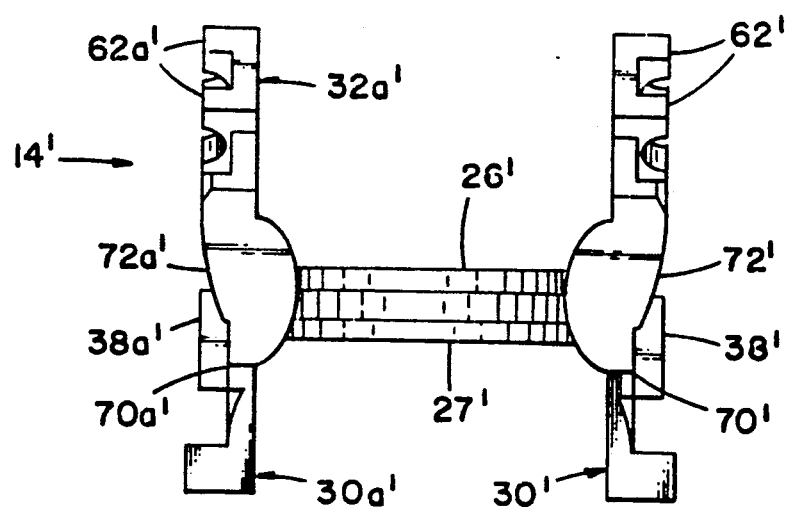
FIG. 20 is a view taken along line 20-20 of FIG. 17.
Figure 21:
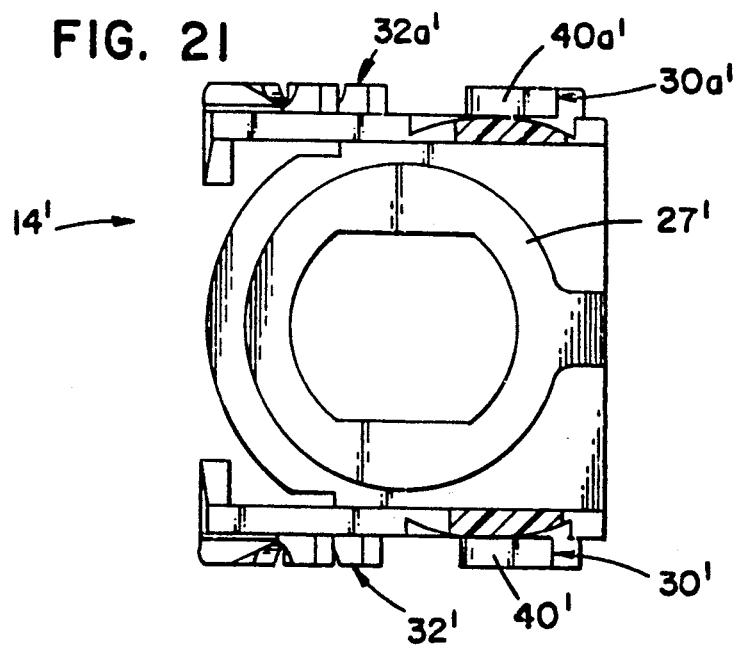
FIG. 21 is a view taken along line 21—21 of FIG. 17.
Figure 22:
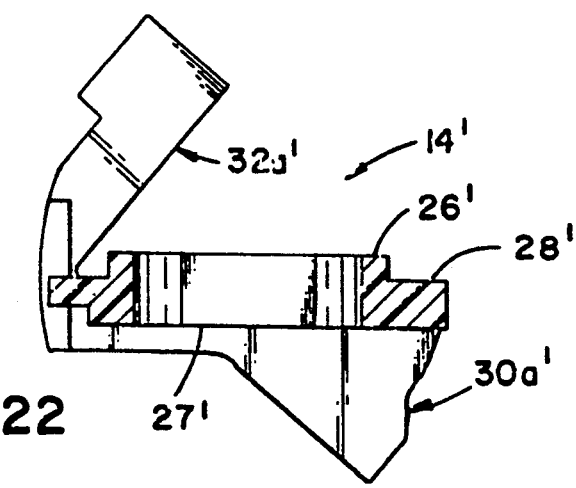
FIG. 22 is a view taken along line 22—22 of FIG. 16.

Extending generally perpendicularly away from outer walls 34 are front support plates 38 having a generally flat retaining surface 40. Also extending generally perpendicularly away from outer walls 34 are a pivot post 42. Pivot post 42 includes a retaining surface 44 which is generally parallel to surface 40 but spaced apart by a distance approximating the thickness of front wall 16. As shown in FIG. 8, the plane of surfaces 40,44 is set at an angle of about 45# with central axis X—X of the retaining member 26. The post 42 also includes a pivot surface 46 which is generally perpendicular to the axis X—X as shown best in FIG. 8.

Figure 4:
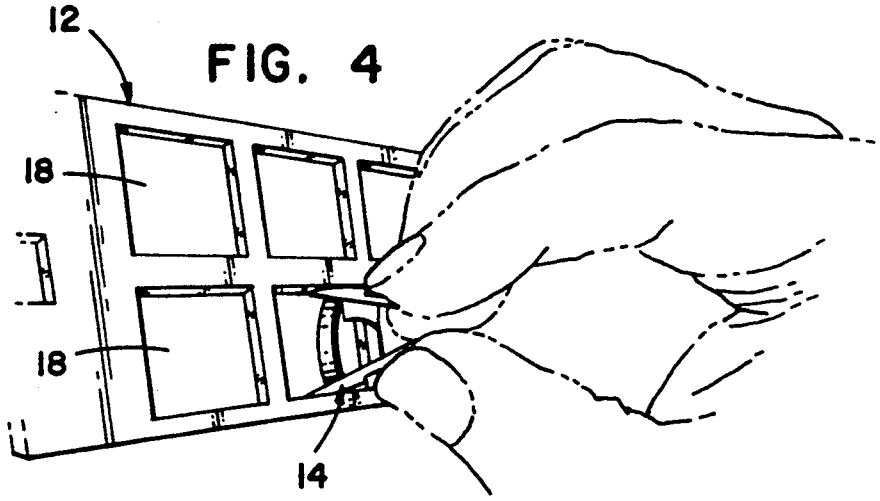
FIG. 4 is a perspective view showing a retainer about to be fastened in position.
Figure 5:
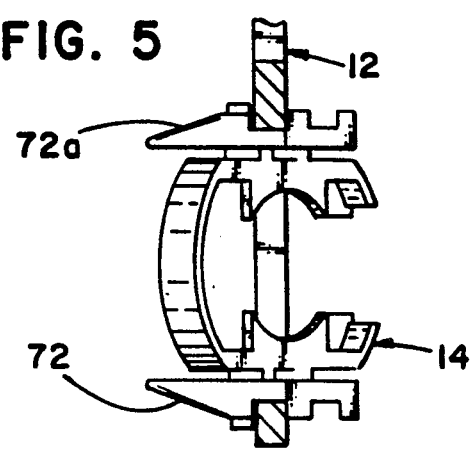
FIG. 5 is an end view showing a retainer in position.
Figure 6:
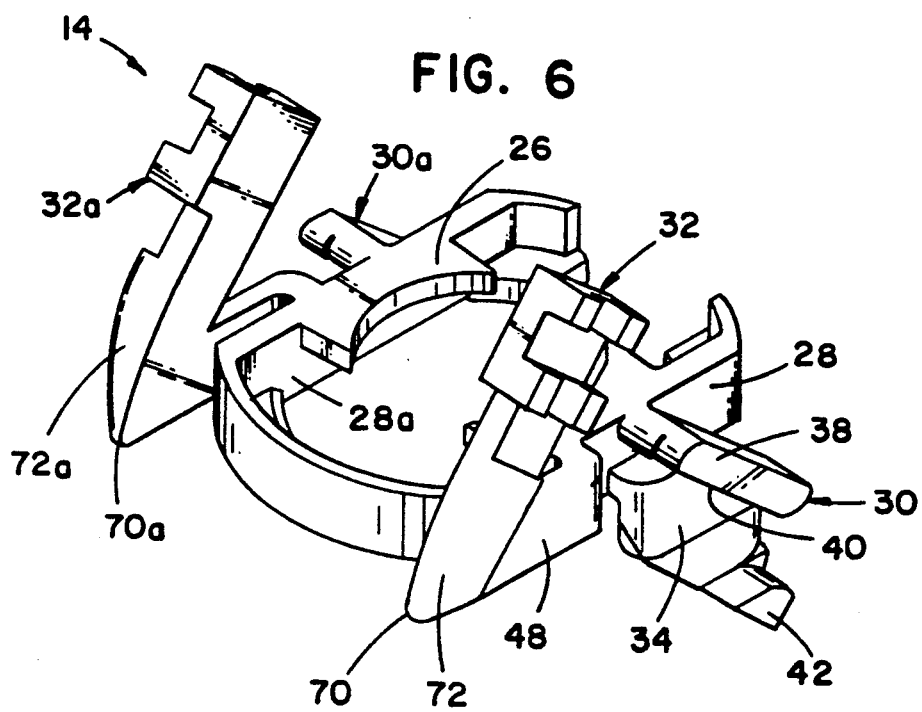
FIG. 6 is a perspective view of a retainer for use with a D-4 connector.
Figure 7:
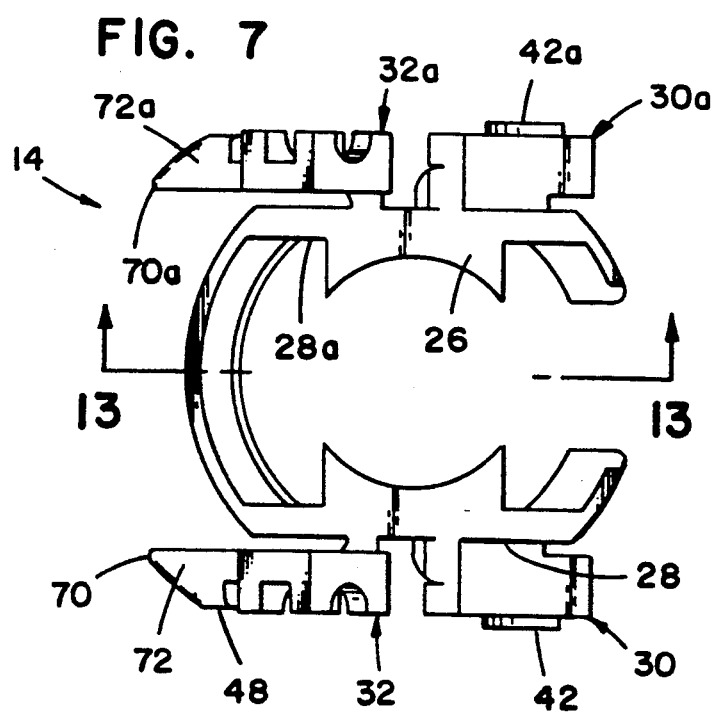
FIG. 7 is a front plan view of the retainer of FIG. 6.

As shown in FIG. 8, the rear fastener 30 extends angularly and rearwardly away from a bottom edge 27 of side wall 28. The front fastener 32 extends angularly and inwardly away from a top edge 29 of side wall 28. The front fastener 32 is connected to an arm 48 which is secured to side wall 28 in spaced generally parallel in relation thereto. A second leg 60 extends upwardly and inwardly from edge 29. A distal end of leg 60 is provided with outwardly protruding pins 62 which may be engaged by the fingers of an operator. For example, an operator can have a thumb opposing pins 62 and an index finger opposing pins 62a (see FIG. 4).

The leg 60 includes an upper retaining surface 64 and a lower retaining surface 66. The surfaces 64,66 are generally parallel and spaced apart a distance approximate to a thickness of the front wall 16. Surfaces 64,66 are generally co-planer with surfaces 40,44, respectively. Between surfaces 64,66, leg 60 is provided with an outer wall 68 which is generally parallel with outer wall 34. Accordingly, an edge 36 may be received between surface pairs 64,40 and 66,44 (see phantom lines in FIG. 3). With the edge so received, the retainer is securely received within the frame 12.

In a preferred embodiment, retainer 14 is injection molded from a flexible resilient plastic. Accordingly, an operator may grasp pins 62,62a and urge legs 60,60a together (see FIG. 4). By doing so, the arms 60,60a are moved against their bias from the rest position (shown in FIG. 6) to a displaced position (FIG. 4) whereby the retainer 14 may be inserted and passed through the access opening 18. At the apex 70 of V-shaped front fastener 32, the legs 60 are provided with an inwardly angled cam surface 72.

Figure 3:
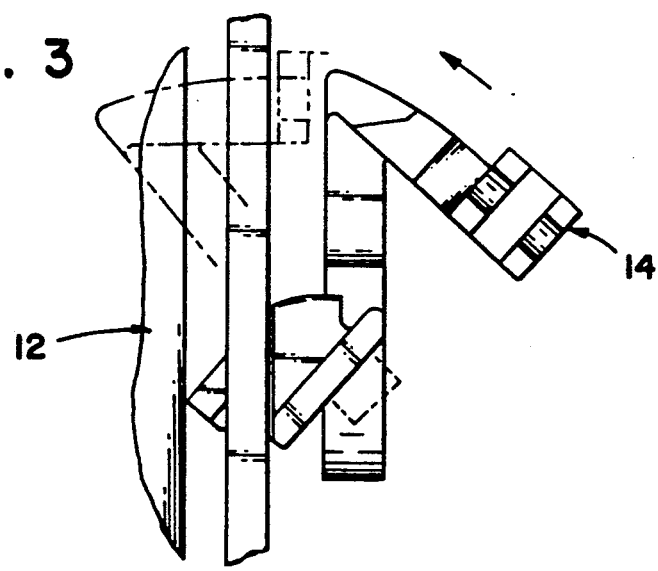
FIG. 3 is a top elevation view, partially in section, showing a retainer about to be placed in a fastened position (shown in phantom in FIG. 3)

To insert the retainer 14 in access opening 18, the retainer 14 is placed in access opening 18 with edges 36 received between surfaces 46 and 40 and with the edge generally abutting pivot surface 46. In this position, apex 70 rests against the front surfaces of edges 36. Pressing downwardly (i.e., along the length) of legs 60, the cam surfaces 72,72a act against the side edges 36 to urge arms 48 to flex inwardly to permit the second fasteners 32,32a to pass between the side edges 36,36a until the side edges 36,36a are received between surfaces 64,66,64a,66a at which point the legs 60,60a are urged by their bias to an outward position capturing the edge between surfaces 64,66,64a,66a. In the process of urging the leg 60 downwardly, the side edge 36,36a pivots on pivot post 42,42a (as shown in FIG. 3) to a position, with the side edge 36 captured between surfaces 44,40,44a,40a.

As can be seen from the foregoing, the retainer 14 may be quickly inserted or removed from an access opening 18. In the inserted position, the retainer 14 holds the receiving member 26 with its central axis X—X generally at a 45# angle to the front wall 16. As shown in FIG. 1, the access openings 18 are sized to receive one or more retainers 14. The ease of insertion and removal of the retainer 14 permits an operator to change connector types readily when desired. A primary benefit is to service damaged or dirty connectors.

FIGS. 15-24 show an additional retainer 14, in accordance with the present invention. Retainer 14' is identical to retainer 14 except that retainer 14' includes a receiving member 26' selected to receive and retain a so called commercially available ST connector. Since the fastening elements of retainer 14' is identical to that of retainer 14, a complete description will not be given. Instead, reference numerals of retainer 14' are identical to the reference numbers of retainer 14 except for the addition of an apostrophe to indicate that the retaining features are the same as for retainer 14 simply illustrating their use with a different style receiving member 26'.

From the foregoing, it has been shown how the objects of the invention have been obtained in a preferred manner. However, modifications and equivalence of the disclosed concepts are intended to be included within the scope of the present invention.

What is claimed is:

1. A retainer assembly for a fiber optic connector, said
assembly comprising:
a frame having a wall with an access opening therethrough, said wall having a predetermined thickness;
a retainer having a receiving means for receiving and supporting a fiber optic connector;
a first releasable fastener connected to said retainer for fastening a first end of said retainer to said frame;
said first releasable fastener including a forward retaining surface and rear retaining surface apart a distance approximate to a said predetermined thickness;
a second releasable fastener connected to said retainer for fastening a second end of said retainer to said frame;
said second releasable fastener including a second forward retaining surface and a second rear retaining surface;
said second forward and rear retaining surfaces resiliently connected to said receiving means to be urged between a rest position and a displaced position;
said second forward and rear retaining surfaces spaced apart a distance approximate to a thickness of said wall for said wall to be received between said surfaces in said rest position and said wall to be free from said surfaces in said displaced position.

2. A retainer assembly according to claim 1 wherein said first and second releasable fasteners are disposed relative to said receiving means for said receiving means to have an axis disposed at a non-orthogonal angle to said wall when said first and second fasteners are connected to said frame.

3. A retainer assembly according to claim 1 wherein said first fastener includes a pivot surface in close proximity to said first surface for said retainer to pivot at said pivot surface.

4. A retainer assembly according to claim 1 wherein said second fastener has a cam surface sized to oppose said frame and urge said second fastener inwardly to the displaced position as said fastener is inserted into said access opening.

5. A retainer assembly according to claim 1 wherein said second fastener includes first and second resilient legs, a first leg secured to said receiving member and spaced relation thereto and a second leg extending from said first leg with said first and second surfaces carried on said second leg.

6. A retainer assembly according to claim 1 wherein said first forward and rear retaining surfaces are generally parallel and aligned with said second forward and rear retaining surfaces, respectively.

* * * * *

UNITED STATES PATENT AND TRADEMARK OFFICE
CERTIFICATE OF CORRECTION

PATENT NO. : 5,214,735
DATED : May 25, 1993
INVENTOR(S) : Henneberger et al.

It is certified that error appears in the above-identified patent and that said Letters Patent is hereby corrected as shown below:

Col. 1, line 24, "Pat. No.," should read --patent,--.

Col. 1, line 27, "Pat. No.," should read --patent,--.

Col. 2, line 37, "FIGURES" should read --figures--.

Col. 3, line 12, "are" should read --is--.

Col. 3, line 17, "45#" should read --45°--.

Col. 3, line 26, "in" should read --and is--.

Col. 4, line 7, "45#" should read --45°--.

Col. 4, line 13, "14" should read --14'--.

UNITED STATES PATENT AND TRADEMARK OFFICE
CERTIFICATE OF CORRECTION

PATENT NO. : 5,214,735

DATED : May 25, 1993

INVENTOR(S) : Henneberger et al.

It is certified that error appears in the above-identified patent and that said Letters Patent is hereby corrected as shown below:

Col. 4, line 43, insert --, said forward retaining surface and rear retaining surface spaced-- after the word "surface".

Col. 6, line 2, insert --in-- after the word "and".

Signed and Sealed this

First Day of March, 1994

Attest:

BRUCE LEHMAN

Attesting Officer

Commissioner of Patents and Trademarks